United States Patent [19]

Mathias et al.

[11] Patent Number: 4,644,050
[45] Date of Patent: Feb. 17, 1987

[54] POLY(1-OXY-3-LACTAM VINYLENE)

[75] Inventors: Lon J. Mathias; Douglas R. Moore, both of Hattiesburg, Miss.

[73] Assignee: University of Southern Mississippi, Hattiesburgh, Miss.

[21] Appl. No.: 775,768

[22] Filed: Sep. 13, 1985

[51] Int. Cl.⁴ .............................................. C08G 69/14
[52] U.S. Cl. .................... 528/323; 528/326; 528/367
[58] Field of Search ........................ 528/323, 326, 367

[56] References Cited

U.S. PATENT DOCUMENTS

| 3,481,923 | 12/1969 | Naarmann et al. | 528/323 |
| 3,634,363 | 1/1972 | Schmitt et al. | 528/323 |
| 3,887,643 | 6/1975 | Selman | 528/323 |

Primary Examiner—Harold D. Anderson
Attorney, Agent, or Firm—Wegner & Bretschneider

[57] ABSTRACT

Poly(1-oxy-3-lactam vinylenes) of the formula

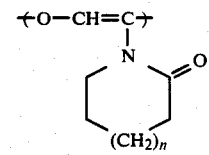

wherein n is 1, 2, or 3 are disclosed formed by the polymerization of 1-(2-chloroacetyl)lactams having 5, 6, or 7 carbon atoms in the lactam ring. The polymers are useful reactants in polyester and polyurethane formation.

8 Claims, No Drawings

POLY(1-OXY-3-LACTAM VINYLENE)

BACKGROUND OF THE INVENTION

The present invention relates to poly(1-oxy-3-lactam vinylenes) formed by the polymerization of 1-(2-chloroacetyl)lactams.

DISCUSSION OF THE PRIOR ART

Polymers formed by the polymerization of lactams such as caprolactam are well known. These reaction products form by ring opening of the caprolactam to form a polyamide. See U.S. Pat. No. 2,251,519. Lactam polymerization proceeds by the anionic or cationic routes or by hydrolytic ring opening.

The polymerization of simple N-acyl lactams using carboxylic acid initiators and high temperatures has been reported. Sebenda et al., Polymer, 20: 1305–1306 (1979). The polymers are ring-opened polyamides having N-acyl substituents.

BRIEF DESCRIPTION OF THE INVENTION

The present invention is directed to poly(1-oxy-3-lactam vinylenes) prepared by the polymerization of 1-(2-chloroacetyl)lactams. In contrast to other polymerizations involving lactams (both unsubstituted or acyl substituted), there is no ring cleavage of the lactam but rather an adjustment or rearrangement of the 2-chloroacetyl group to give poly(1-oxy-3-lactam vinylenes) of the formula

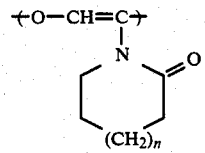

where n is 1, 2, or 3.

DETAILED DESCRIPTION OF THE INVENTION

The poly(1-oxy-3-lactam vinylenes) of the present invention are formed by the polymerization of 1-(2-chloroacetyl)lactams of the formula

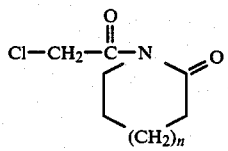

wherein n is 1, 2, or 3. Thus, the compounds used to prepare the polymers of the present invention are 1-(2-chloroacetyl)caprolactam and the piperidone and azacyclooctane counterparts. The monomers can be prepared by reacting chloroacetyl chloride and the desired lactam to form the 1-(2-chloroethyl)lactam. A preferred method for the preparation of a representative monomer is set out in the first working example, infra.

Although not wishing to be bound to any theory, it is believed that the poly(1-oxy-3-lactam vinylenes) of the present invention are formed through a mesionic intermediate. More particularly, it is believed that the reaction proceeds as follows (using 1(2-chloroacetyl)caprolactam as the monomer):

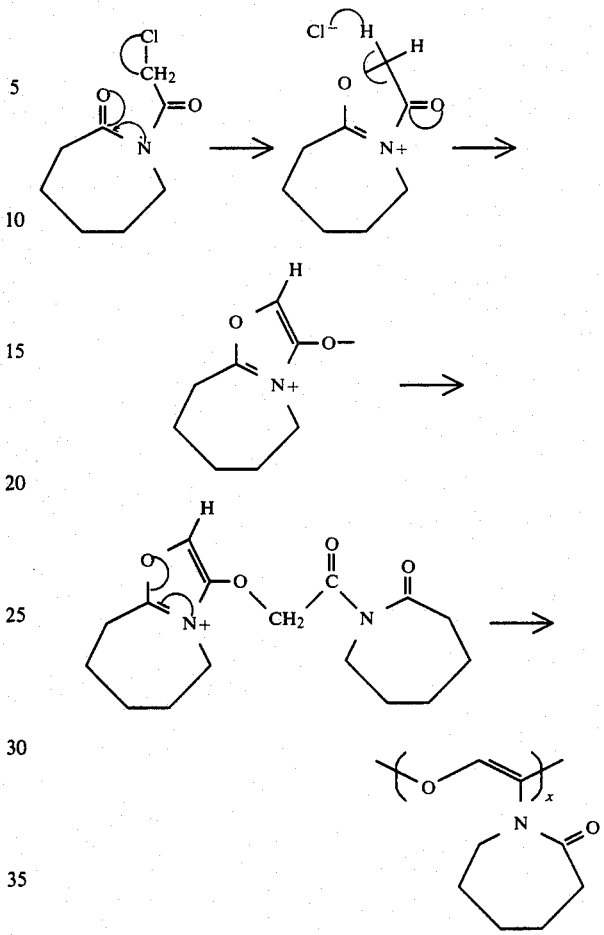

As seen from the drawing, the 1-(2-chloroacetyl)lactam is cyclized to form a bicyclic hydro-1,3-oxazolium-4-oxide which in turn eliminates HCl to form a mesoionic 1,3-oxazolium-4-oxide or "isomunchnone". The mechanism for polymerization proceeds through sequential Michael addition and ring-opening.

The poly(1-oxy-3-lactam vinylenes) of the present invention have inherent viscosities of about 0.03 to about 0.07 dl/g (0.5 g/dl in dimethyl sulfoxide). The polymers of the present invention are soluble in a variety of organic solvents including methanol, benzene, dimethyl sulfoxide, and tetrahydrofuran. The polymers are water-insoluble and appear to be non-crystalline. Polymers prepared to date do not have molecular weights sufficient to permit their use as films or fibers.

The polymers are useful as reactants in the production of polyesters and polyurethanes, as activators for lactam polymerization to form new types of nylon "comb" polymers, and to complex metals or cations.

Polymerization can be carried out by subjecting the 1-(2-chloroacetyl)lactams to heating at moderate temperatures. Polymerization will also proceed spontaneously at room temperature over a two- to three-day period.

Polymer configuration has been confirmed by IR, UV, $^1$H, and $^{13}$C NMR including Cross-Polorization/-Magic Angle Spinning solid state NMR. $^{13}$C NMR shows no peaks for the chloromethylene carbon and one of the monomer carbonyls but does show resonances for the oxyvinylene polymer backbone carbons and peaks similar to those of a substituted lactam with unopened rings attached to the alpha carbon.

Degradation studies of the polymers with refluxing 85% phosphoric acid indicate the formation of 6-aminohexanoic acid and hydroxyethanoic acid, the latter coming from side chain cleavage and isomerization of the resulting poly(oxy-3-hydroxy vinylene) to poly(1-oxocarbonylmethylene), which is degraded to hydroxyethanoic acid.

The caprolactam-based polymer is white to yellow in color while the 2-piperidone-based polymer is white to deep red in color and the 2-azacyclooctanone-based polymer is white to yellow-gold in color.

The following examples are representative of the invention.

EXAMPLE 1

Caprolactam and chloroacetyl chloride were mixed in a mole ratio of 2:1.126 in benzene under nitrogen at room temperature. The solution was allowed to come slowly to room temperature and react for 24 hours. Filtration of the insoluble caprolactam hydrochloride and evaporation of benzene gave pure 1-(2-chloroacetyl)caprolactam in an 85% yield.

The same method was used to prepare 1-(2-chloroacetyl)piperidone and 1-(2-chloroacetyl)-2-azacyclootanone.

EXAMPLE 2

Polymer formation was carried out by charging 9.94 g of 1-(2-chloroacetyl)caprolactam to a 100 ml vacuum flask and heating it for 1 hour at 100° C. under 0.05 mm Hg. The resulting polymer was dissolved in methanol, precipitated into water, collected, and dried to give 7.36 g of product with an inherent viscosity of 0.051 dl/g (0.5 g/dl in dimethylsulfoxide).

EXAMPLE 3

Polymer formation was carried out by charging 4.75 g of 1-(2-chloroacetyl)caprolactam to a 100 ml single neck round bottom flask with 10 g of dimethylformamide. The solution was heated to reflux and held for 1 hour, after which the cooled solution was poured into rapidly stirring water where polymer precipitated. The polymer was filtered and dried under vacuum at 45° C. for 24 hours giving 2.71 g (57% yield based on monomer) of polymer. The inherent viscosity was 0.046 dl/g (0.5 g/dl in dimethylsulfoxide).

What is claimed is:

1. A polymer having repeating units of the formula

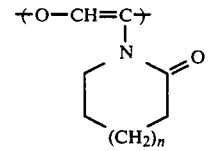

wherein n is 1, 2, or 3.

2. The polymer of claim 1 wherein n is 1.
3. The polymer of claim 1 wherein n is 2.
4. The polymer of claim 1 wherein n is 3.
5. The polymer of claim 1 having an inherent viscosity of about 0.03 to about 0.07 dl/g as determined in dimethyl sulfoxide at a concentration of 0.5 g/dl.
6. The polymer of claim 1 formed by polymerizing 1-(2-chloroacetyl)caprolactam.
7. The poymer of claim 1 formed by polymerizing 1-(2-chloroacetyl)piperidone.
8. The polymer of claim 1 formed by polymerizing 1-(2-chloroacetyl)-2-azacyclooctanone.

* * * * *